No. 614,284. Patented Nov. 15, 1898.
J. F. BARNETT.
BICYCLE WHEEL.
(Application filed May 18, 1898.)
(No Model.)

Witnesses
Caspar Simonds
Anita Loomis

Inventor
John F. Barnett
By W. E. Simonds
Attorney

UNITED STATES PATENT OFFICE.

JOHN F. BARNETT, OF HARTFORD, CONNECTICUT, ASSIGNOR TO ROBERT A. BARNETT, OF SUFFIELD, CONNECTICUT.

BICYCLE-WHEEL.

SPECIFICATION forming part of Letters Patent No. 614,284, dated November 15, 1898.

Application filed May 18, 1898. Serial No. 681,005. (No model.)

*To all whom it may concern:*

Be it known that I, JOHN F. BARNETT, a citizen of the United States of America, residing at Hartford, in the county of Hartford and State of Connecticut, have invented a certain new and useful Improvement in Bicycle-Wheels, of which the following is a description, reference being had to the accompanying drawings, wherein—

Figure 1:
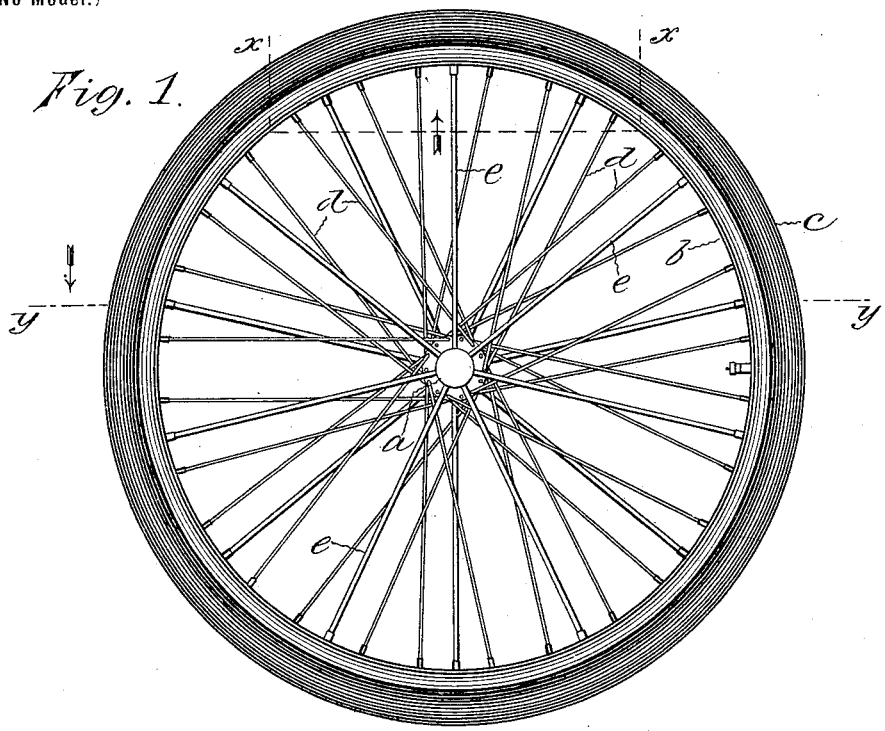
Figure 2:
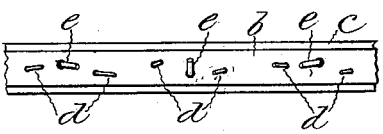
Figure 3:
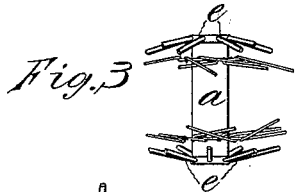
Figure 4:
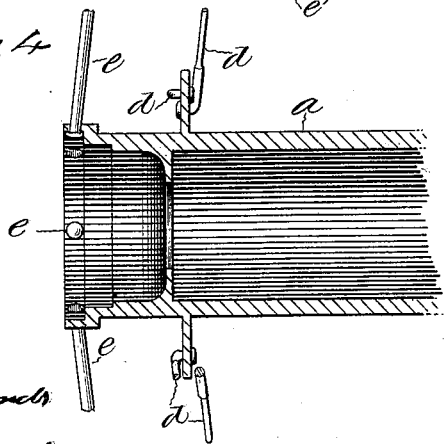

Figure 1 is a side elevation view of a bicycle-wheel embodying said improvement. Fig. 2 is a view in cross-section on the plane denoted by the dotted line $x\ x$, looking in the direction denoted by the overlying arrow, a view designed to show the staggering of the spokes in their attachment to the rim. Fig. 3 is a view in partial cross-section on the plane denoted by the dotted line $y\ y$, the view being restricted in scope to the hub and those parts of the spokes adjacent to the hub. Fig. 4 is a view, on an enlarged scale, in central section of a part of the hub and certain spokes, a view designed to illustrate the immediate attachment of the spokes to the hub.

The object of the improvement is the production of a wheel for a bicycle or the like having features of construction and of novelty hereinafter described and claimed.

In the accompanying drawings the letter $a$ denotes the hollow hub, $b$ the rim, and $c$ the tire.

The wheel has two inner sets of spokes made up of the spokes $d$ and two outer sets of spokes made up of the spokes $e$. The two inner sets of spokes are set tangential of the hub, (meaning by "tangential" not necessarily a true tangent to the hub, but a direction approximating thereto in some degree.) The outer sets of spokes are set in a plane which is radial to the hub. Therefore they are spoken of herein as "radial," and practically each one of the radial spokes bisects the space defined by the two inner spokes which are nearest that particular outer spoke at the hub. The two inner sets of spokes are staggered in their attachment to the rim, and the two outer sets of spokes are also staggered in their attachment to the rim. The inner ends of the inner sets of spokes are attached to and through collars appurtenant to the hub. The inner ends of the outer sets of spokes run directly through the shell of the hub.

The construction described gives the wheel great strength and durability.

I claim as my improvement—

1. In combination, the hub, the rim, the two inner sets of spokes set tangential to the hub, and the two outer sets of spokes set radial to the hub, all substantially as described and for the purposes set forth.

2. In combination, the hub, the rim, the two inner sets of spokes set tangential to the hub and staggered in their attachment to the rim, and the two outer sets of spokes set radial to the hub and staggered in their attachment to the rim, all substantially as described and for the purposes set forth.

3. In combination, the hub, the rim, the two inner sets of tangent spokes attached to and through the collars on the hubs, and the two outer sets of radial spokes attached to and through the shell of the hub, all substantially as described and for the purposes set forth.

4. In combination, the hub, the rim, the two inner sets of spokes attached to and through the collars on the hub, and the two outer sets of spokes attached to and through the shell of the hub, all substantially as described and for the purposes set forth.

JOHN F. BARNETT.

Witnesses:
 W. E. SIMONDS,
 ANITA LOOMIS.